(12) United States Patent
Tien

(10) Patent No.: US 9,748,996 B2
(45) Date of Patent: Aug. 29, 2017

(54) PROTECTIVE COVER FOR ELECTRONIC DEVICE

(71) Applicant: HON HAI PRECISION INDUSTRY CO., LTD., New Taipei (TW)

(72) Inventor: Li-Wen Tien, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 15 days.

(21) Appl. No.: 14/717,538

(22) Filed: May 20, 2015

(65) Prior Publication Data

US 2016/0066457 A1    Mar. 3, 2016

(30) Foreign Application Priority Data

Aug. 29, 2014  (CN) .......................... 2014 1 0434498

(51) Int. Cl.
| | | |
|---|---|---|
| *B65D 25/24* | (2006.01) | |
| *B65D 5/52* | (2006.01) | |
| *H04B 1/3888* | (2015.01) | |

(52) U.S. Cl.
CPC ................................. *H04B 1/3888* (2013.01)

(58) Field of Classification Search
CPC  B65D 5/5206; B65D 2207/00; H04B 1/3888; A45C 11/00
USPC ..................... 206/45.2, 45.26, 747, 774, 320; 220/4.21, 4.22, 4.23; 455/575.8; 40/723, 40/755
See application file for complete search history.

(56) References Cited

U.S. PATENT DOCUMENTS

| | | | | |
|---|---|---|---|---|
| 2013/0098789 A1* | 4/2013 | Jun | ....................... | B65D 5/5213 206/320 |
| 2013/0126365 A1* | 5/2013 | Hung | ..................... | B65D 25/00 206/45.24 |
| 2013/0140194 A1* | 6/2013 | Han | ....................... | G06F 1/1656 206/45.23 |
| 2013/0140195 A1* | 6/2013 | Law | ....................... | A45C 11/00 206/45.24 |
| 2014/0202899 A1* | 7/2014 | Murchison | ........... | H05K 5/0013 206/320 |

\* cited by examiner

*Primary Examiner* — Jacob K Ackun
*Assistant Examiner* — Rafael Ortiz
(74) *Attorney, Agent, or Firm* — Steven Reiss

(57) ABSTRACT

A protective cover for an electronic device includes a bottom plate, an integral side wall extending from the edges of the bottom plate. The bottom plate and the integral side wall cooperate to define a concave portion for receiving an electronic device. At least one connecting structure is arranged across the bottom plate and the integral side wall. Each connecting structure divides the protective cover into a first cover and a second cover. One of the first cover or the second cover is able to rotate relative to the other cover via the connecting portion, forming an angle between the first cover and the second cover, whereby the protective cover forms a standing base to support the electronic device at an angle.

11 Claims, 11 Drawing Sheets

PROTECTIVE COVER FOR ELECTRONIC DEVICE

CROSS-REFERENCE TO RELATED APPLICATIONS

This application claims priority to Chinese Patent Application No. 201410434498.2 filed on Aug. 29, 2014, the contents of which are incorporated by reference herein.

FIELD

The subject matter herein generally relates to protective covers for electronic devices.

BACKGROUND

A protective cover is usually used for protecting an electronic device. Some protective covers can also be used for supporting the electronic device at an angle while in use.

BRIEF DESCRIPTION OF THE DRAWINGS

Implementations of the present disclosure will now be described, by way of example only, with reference to the attached figures.

DETAILED DESCRIPTION

Figure 1:
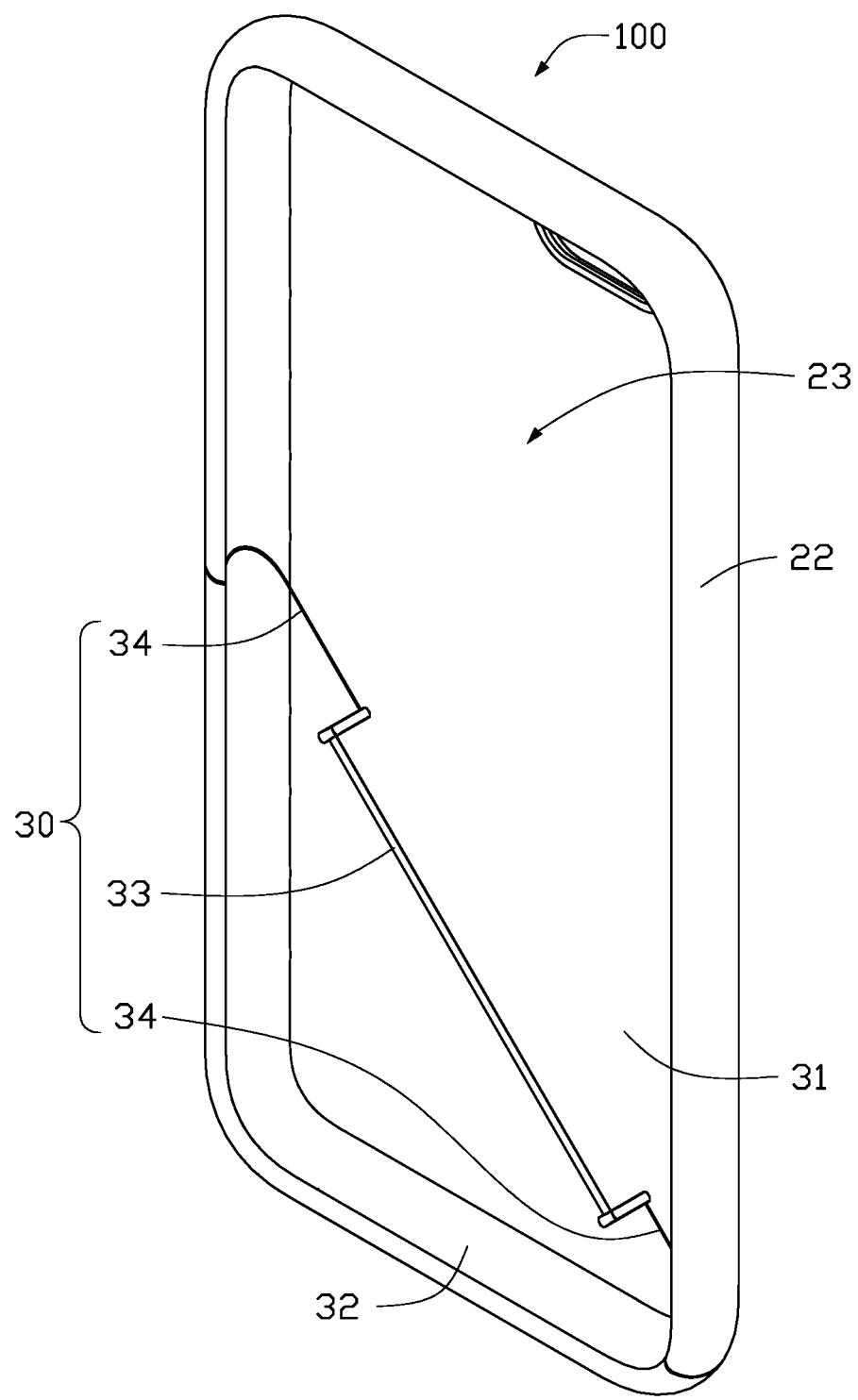
FIG. 1 is an isometric view of a first embodiment of a protective cover for an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts can be exaggerated to better illustrate details and features.

The present disclosure, including the accompanying drawings, is illustrated by way of examples and not by way of limitation. A definition that applies throughout this disclosure will now be presented. It should be noted that references to "an" or "one" embodiment in this disclosure are not necessarily to the same embodiment, and such references mean "at least one."

Furthermore, the term "comprising" means "including, but not necessarily limited to"; it specifically indicates open-ended inclusion or membership in a so-described combination, group, series and the like.

Figure 2:
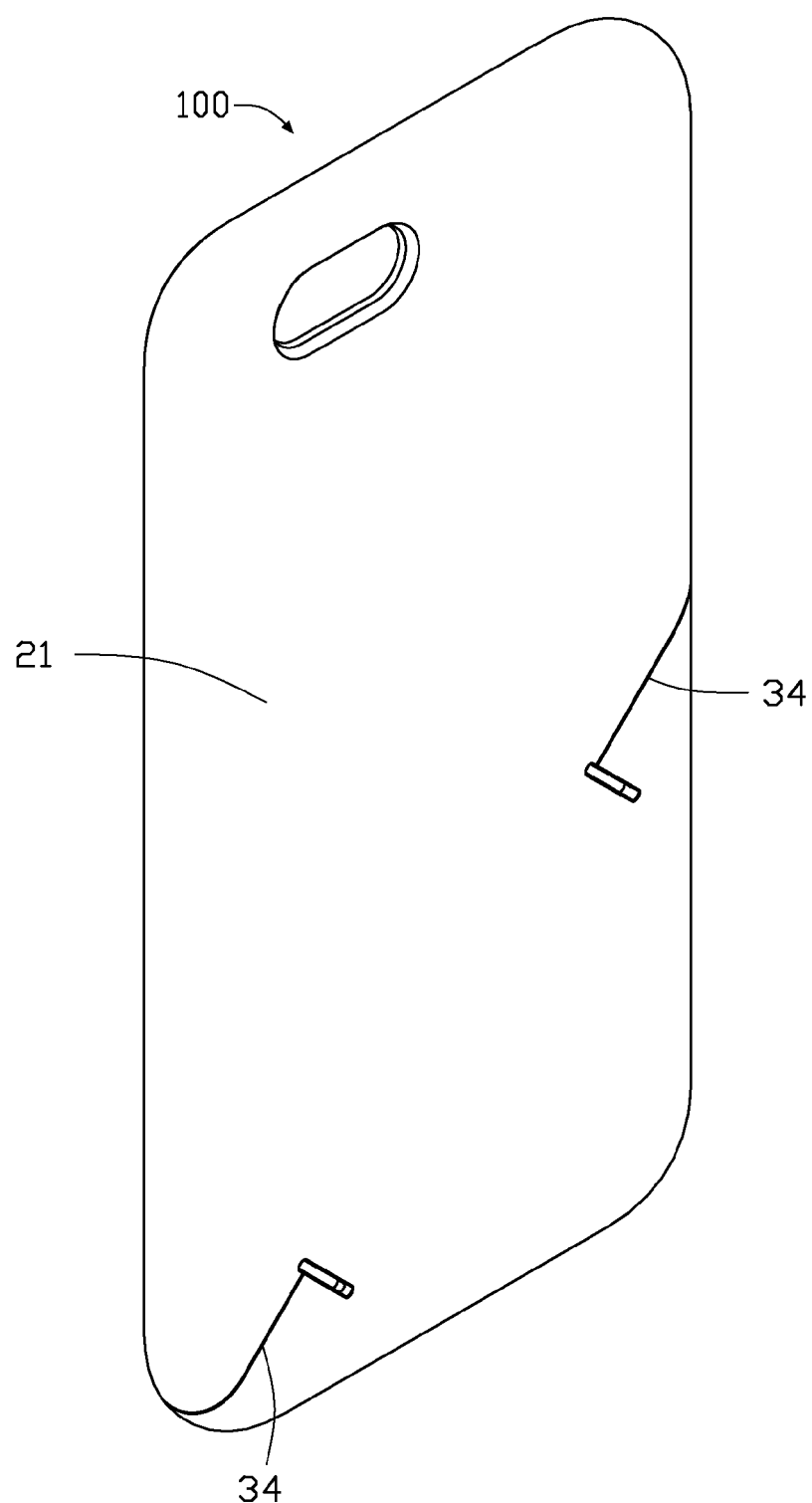
FIG. 2 is an isometric view of the protective cover of FIG. 1 viewed from another angle.
Figure 4:
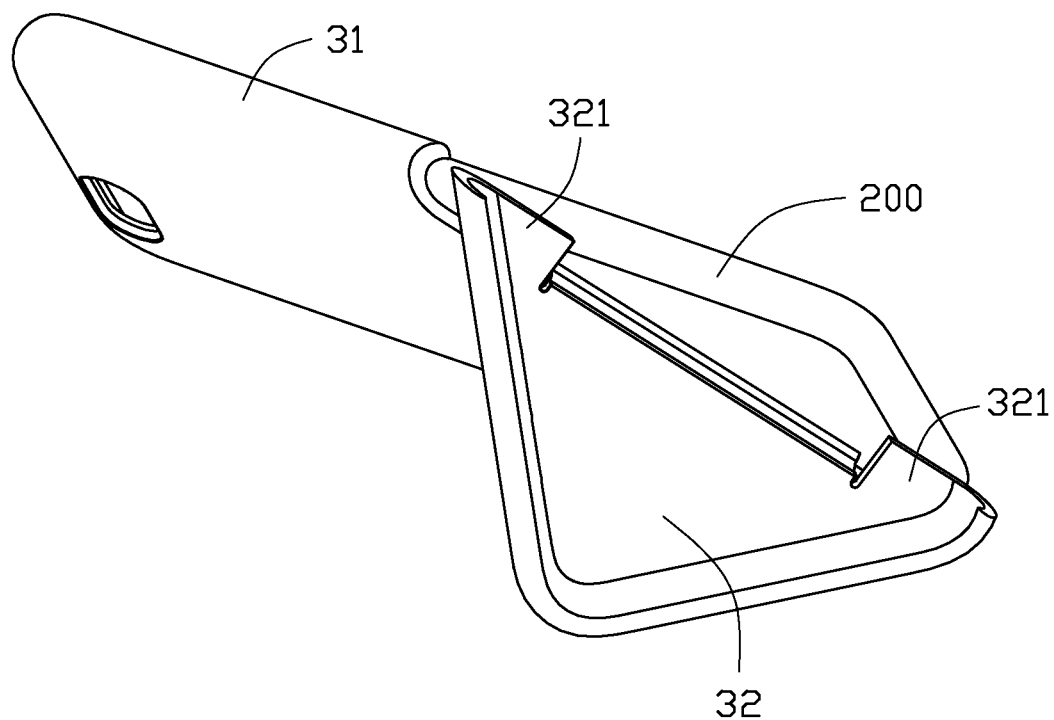
FIG. 4 is an isometric view of the protective cover of FIG. 1 receiving an electronic device.
Figure 5:
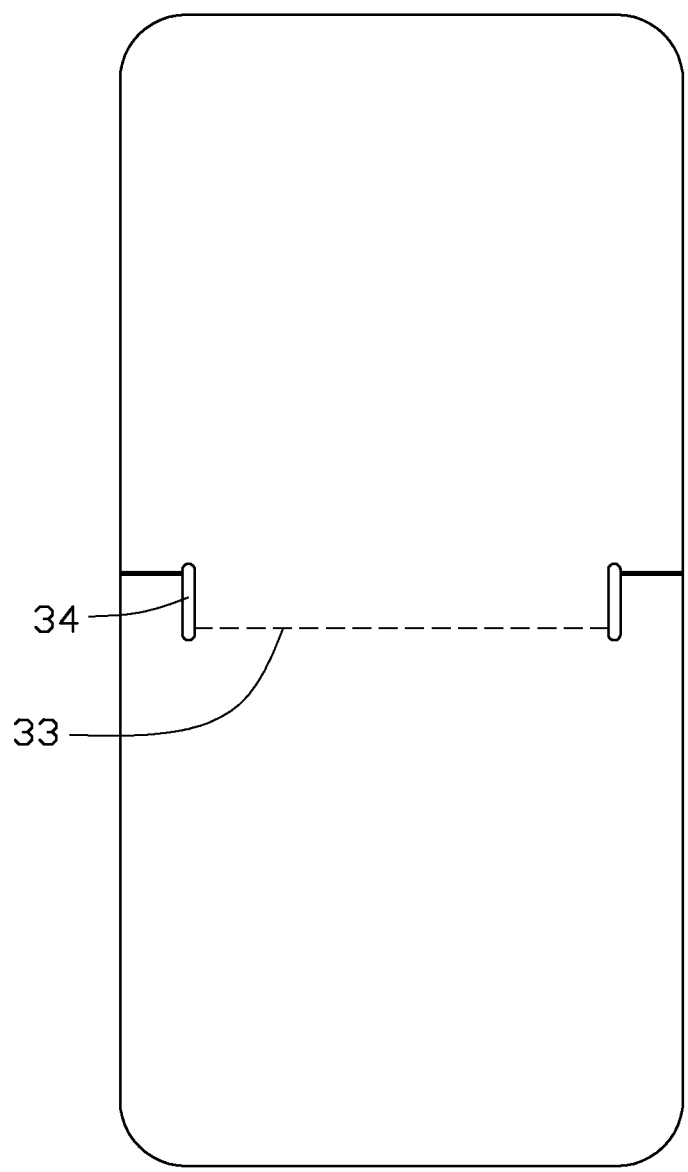
FIG. 5 is an isometric view of a second embodiment of a protective cover for an electronic device.
Figure 6:
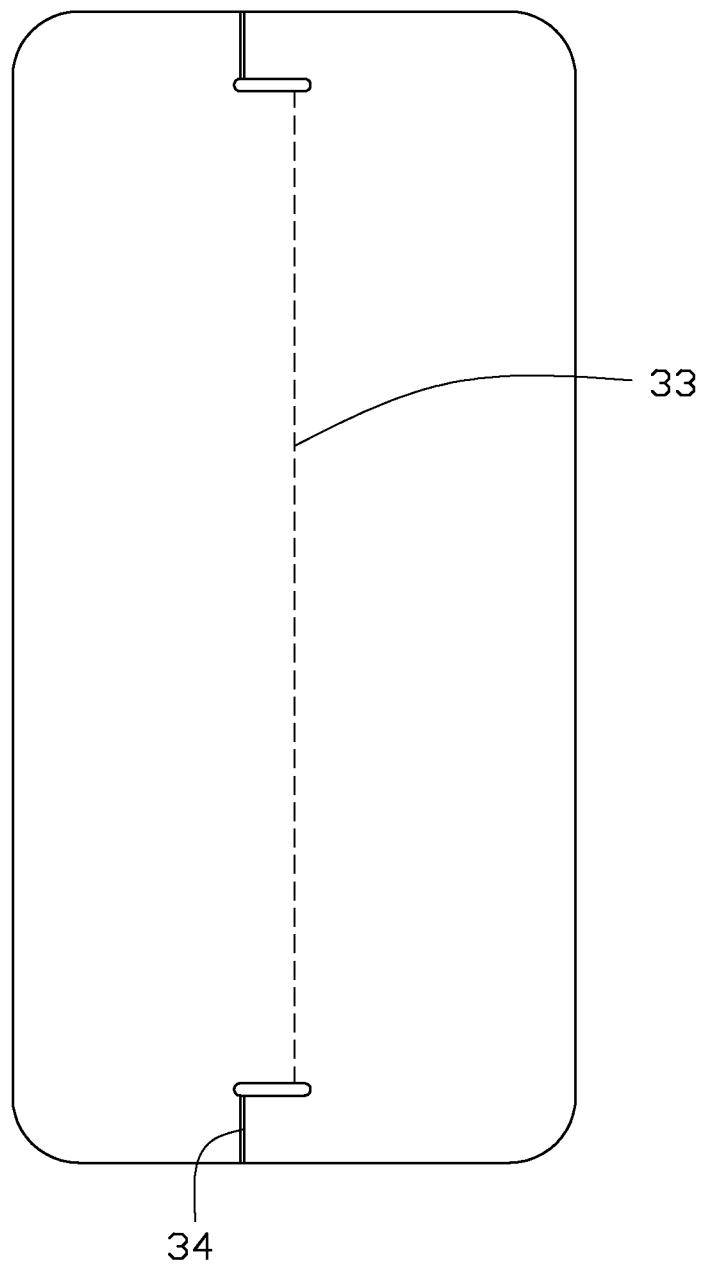
FIG. 6 is an isometric view of a third embodiment of a protective cover for an electronic device.
Figure 7:
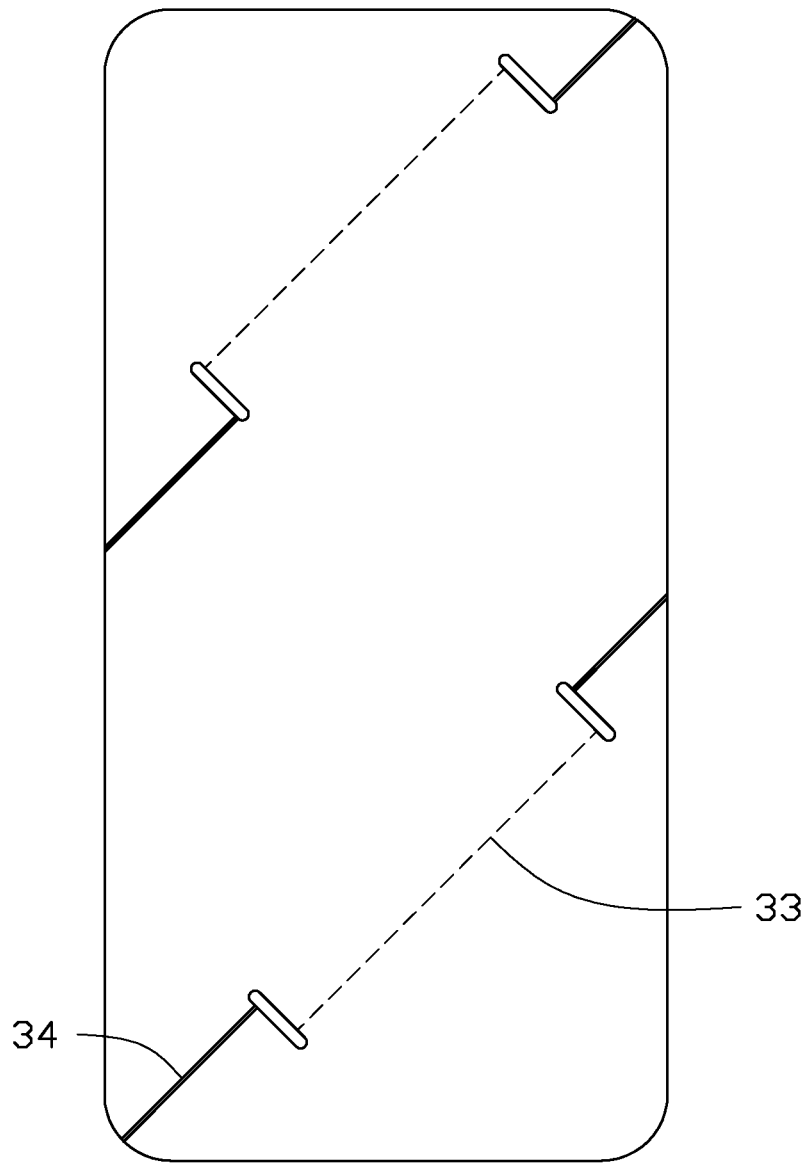
FIG. 7 is an isometric view of a fourth embodiment of a protective cover for an electronic device.
Figure 8:
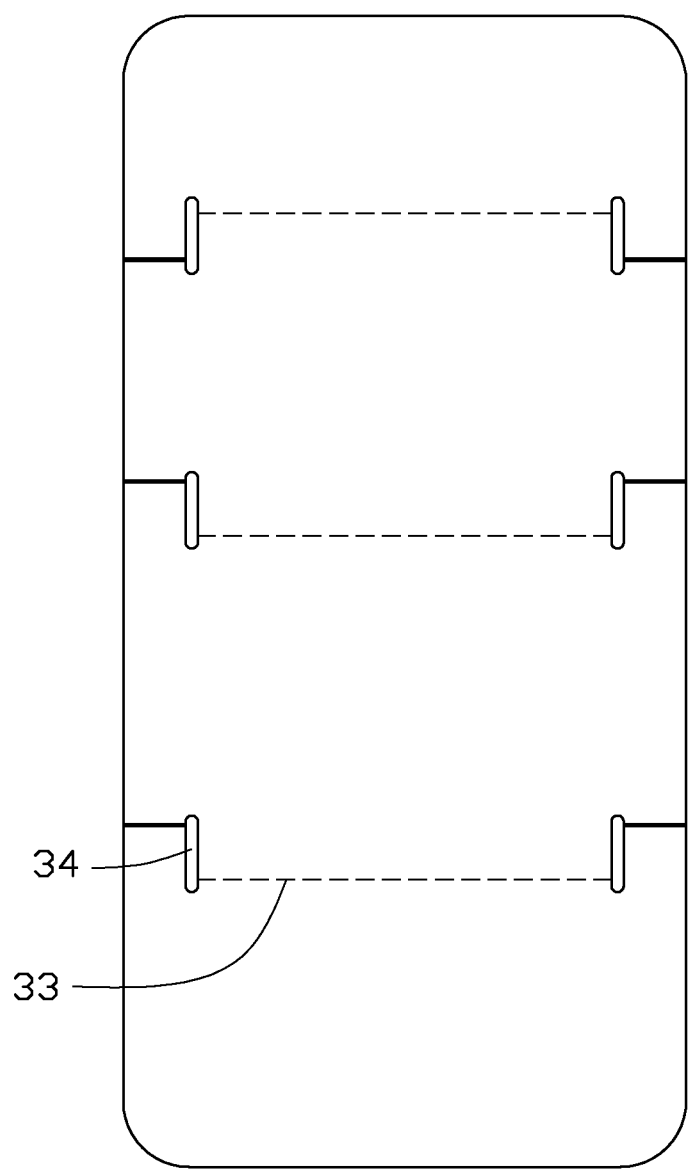
FIG. 8 is an isometric view of a fifth embodiment of a protective cover for an electronic device.
Figure 9:
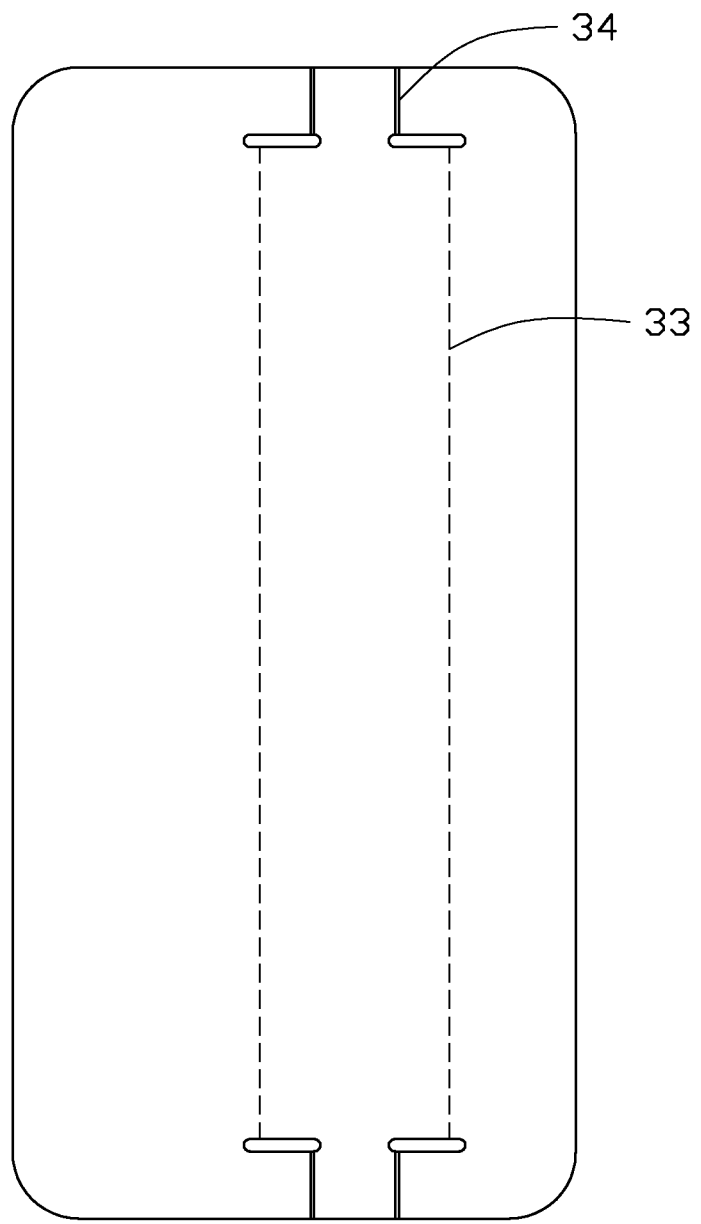
FIG. 9 is an isometric view of a sixth embodiment of a protective cover for an electronic device.
Figure 10:
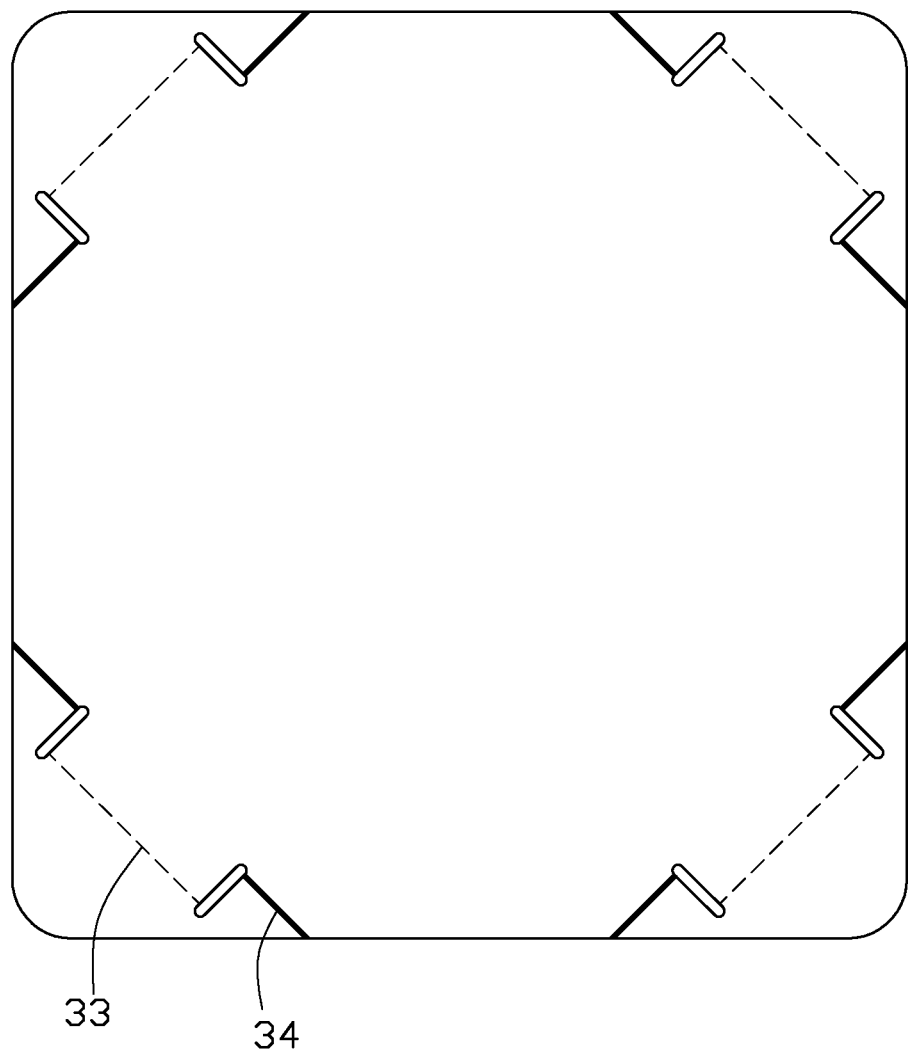
FIG. 10 is an isometric view of a seventh embodiment of a protective cover for an electronic device.
Figure 11:
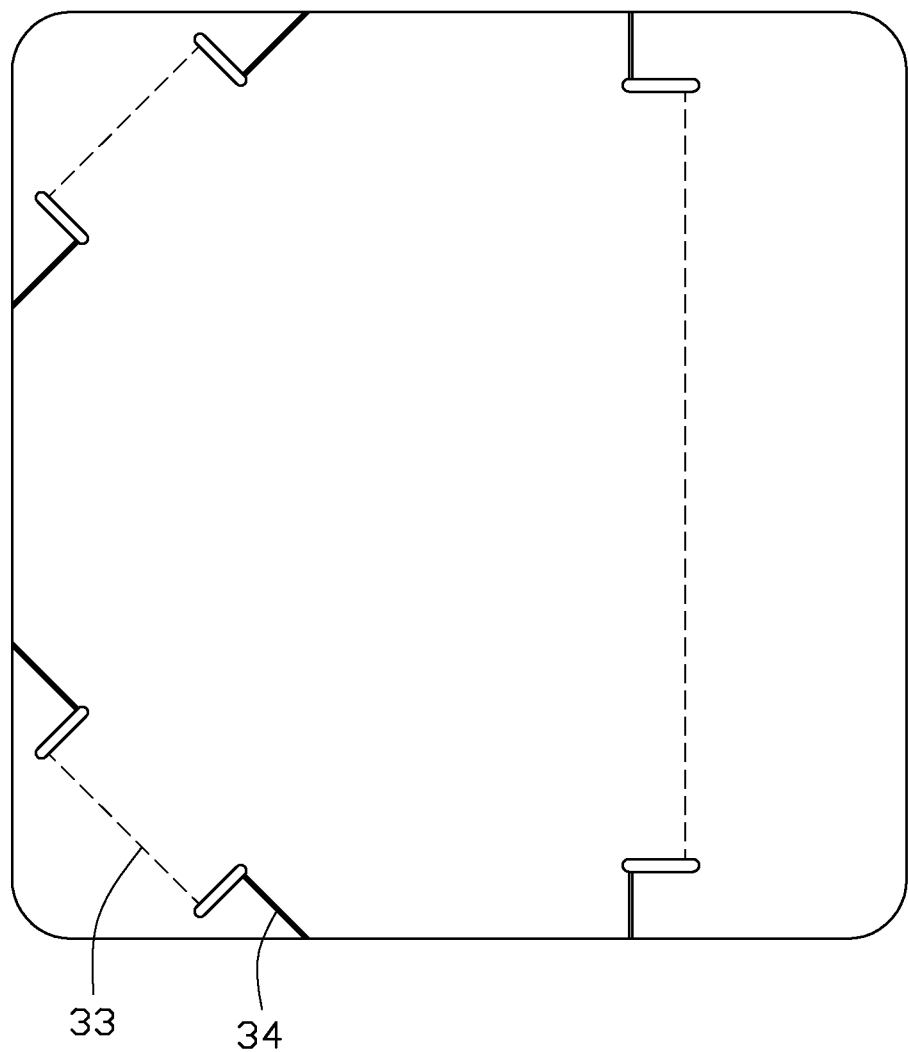
FIG. 11 is an isometric view of an eighth embodiment of a protective cover for an electronic device.

FIG. 1 is an isometric view of a protective cover for an electronic device. In at least one embodiment as shown in FIGS. 1 and 2, a protective cover 100 includes, but is not limited to, a bottom plate 21 having a number of edges and an integral side wall 22 extending from the edges of the bottom plate 21. In the embodiment, the bottom plate 21 and the integral side wall 22 cooperate to define a concave portion 23 for receiving an electronic device 200 (as shown in FIG. 4).

Figure 3:
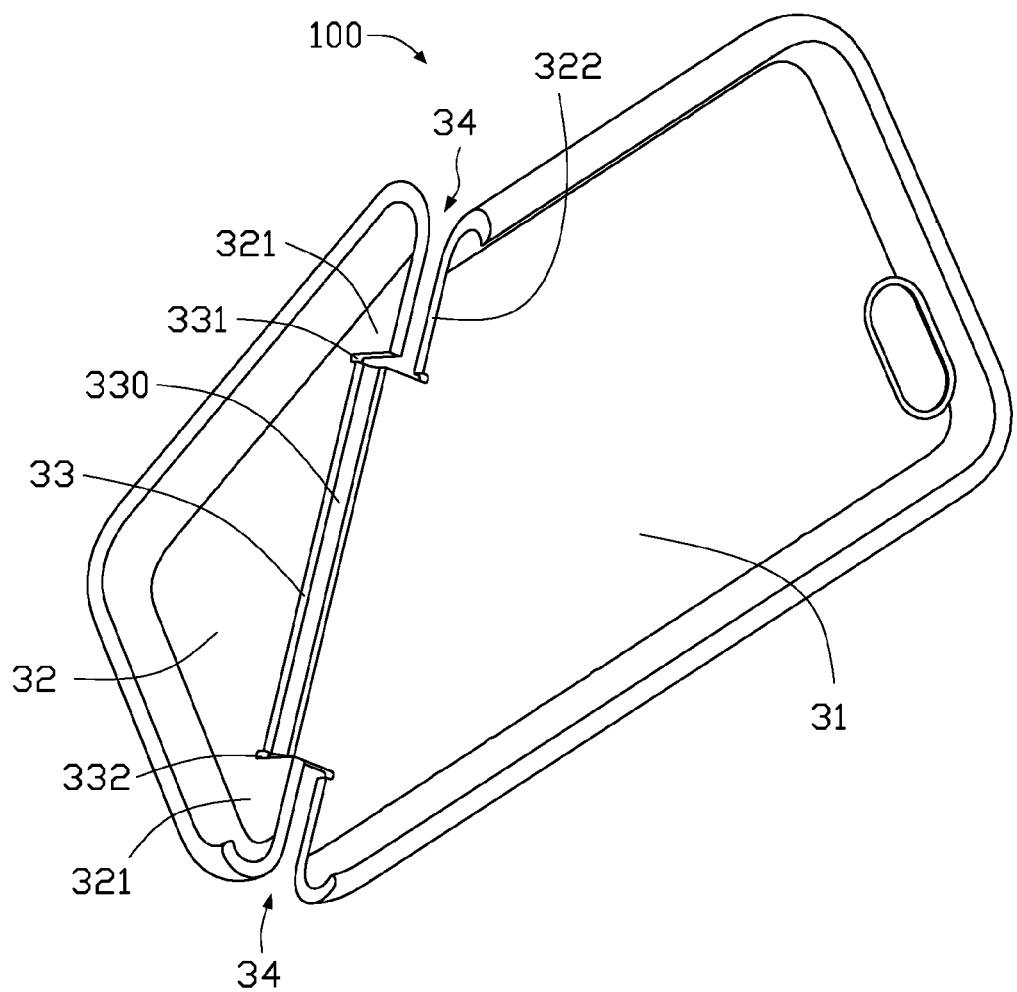
FIG. 3 is an isometric view of the protective cover of FIG. 1 in use.

In the embodiment, the protective cover 100 further includes at least one connecting structure 30 which is arranged across the bottom plate 21 and the integral side wall 22. Each connecting structure 30 includes a flexible connecting portion 33 formed on the bottom plate 21, each flexible connecting portion 33 has two end portions 331 and 332 (as shown in FIG. 3), and each of the two end portions 331 and 332 forms a slit 34 extending to the integral side wall 22. In the embodiment, the slits 34 adjacent to the connecting portion 33 are symmetrically formed on the two end portions 331 and 332 of the connecting portion 33.

In the embodiment, each connecting structure 30 divides the protective cover 100 into a first cover 31 and a second cover 32. In use, as shown in FIGS. 3 and 4, one of the first cover 31 or the second cover 32 is able to rotate relative to the other cover via the connecting portion 33, forming an angle between the first cover 31 and the second cover 32, whereby the protective cover 100 forms a standing base to support the electronic device 200 at an angle.

In the embodiment, the flexible connecting portion 33 is a flexible crease formed on the bottom plate 21. In the embodiment, the flexible connecting portion 33 is formed to define a groove in an internal surface of the bottom plate 21. The flexible connecting portion 33 is made of thermoplastic polyurethane (TPU) material. One of the first cover 31 and the second cover 32 rotates relative to the other cover by stretching the flexible connecting portion 33.

In the embodiment, each slit 34 is formed to be curved, and at least one protrusion portion 321 and at least one matched recessed portion 322 are thereby respectively formed on the second cover 32 and the first cover 31 and respectively facing the slit 34. In the embodiment, the protrusion portion 321 is configured to abut against a bottom surface of the electronic device 200 when the electronic device 200 is received in the protective cover 100, to limit the rotation scope between the first cover 31 and the second cover 32. Therefore, the electronic device 200 received in the protective cover 100 can be secured at a fixed angle.

In the embodiment, the slit 34 has an L-shaped appearance. In other embodiments, the slit 34 can have an appearance of arc shaped, zigzag shaped, wave shaped, and so on.

In the embodiment, the protective cover 100 includes a connecting structure 30. In one embodiment, as shown in FIGS. 1-4, the connecting structure 30 can be distributed on the protective cover 100 along an oblique direction of the protective cover. In other embodiments, as shown in FIGS.

5-6, the connecting structure 30 can be distributed on the protective cover 100 along a width or a length of the protective cover 100.

In other embodiments, the protective cover 100 includes a number of connecting structures 30. As shown in FIGS. 7-11, each of the connecting structures 30 can be distributed on the protective cover 100 along an oblique angle, or along the width or the length of the protective cover 100. Therefore, one or more of the connecting structures 30 can be selected to allow the protective cover 100 to be formed to support the electronic device 200 in different states, for example, the electronic device 200 can stand at different angles.

The embodiments shown and described above are only examples. Even though numerous characteristics and advantages of the present technology have been set forth in the foregoing description, together with details of the structure and function of the present disclosure, the disclosure is illustrative only, and changes can be made in the detail, including in particular the matters of shape, size, and arrangement of parts within the principles of the present disclosure, up to and including the full extent established by the broad general meaning of the terms used in the claims.

What is claimed is:

1. A protective cover comprising:
   a bottom plate having a plurality of edges;
   an integral side wall extending from the plurality of edges of the bottom plate, wherein the bottom plate and the integral side wall cooperate to define a concave portion for receiving an electronic device; and
   at least one connecting structure arranged across the bottom plate and the integral side wall, the at least one connecting structure comprising a flexible connecting portion formed on the bottom plate, the flexible connecting portion having two end portions, and each of the two end portions forming a slit extending to the integral side wall, wherein the at least one connecting structure divides the protective cover into a first cover and a second cover, wherein one of the first cover or the second cover is able to rotate relative to the other cover via the flexible connecting portion, forming an angle between the first cover and the second cover, whereby the protective cover forms a standing base to support the electronic device at an angle, wherein each slit is formed to be curved, at least one protrusion portion and at least one matched recessed portion are thereby formed on the second cover and the first cover and each faces the slit, wherein the protrusion portion is configured to abut against a bottom surface of the electronic device when the electronic device is received in the protective cover, to limit the rotation scope between the first cover and the second cover.

2. The protective cover as described in claim 1, wherein the flexible connecting portion is a flexible crease formed on the bottom plate, wherein one of the first cover and the second cover rotates relative to the other one of the first cover and the second cover by stretching the flexible connecting portion.

3. The protective cover as described in claim 1, wherein the flexible connecting portion is formed to define a groove which is defined in an internal surface of the bottom plate.

4. The protective cover as described in claim 3, wherein the flexible connecting portion is made of thermoplastic polyurethane material.

5. The protective cover as described in claim 1, wherein each slit has an appearance which is selected from a group consisting of L-shaped, arc shaped, zigzag shaped, and wave shaped.

6. The protective cover as described in claim 1, wherein the at least one connecting structure is distributed on the protective cover along a direction which is selected from a group consisting of an oblique angle direction, a width direction, and a length direction of the protective cover.

7. The protective cover as described in claim 6, wherein the protective cover comprises a plurality of connecting structures, one or more of the connecting structures is selected to allow the protective cover to be formed to support the electronic device at different angles.

8. The protective cover as described in claim 6, wherein the at least one connecting structure comprises two connecting structures respectively extending along an oblique angle direction from two opposite edges to two opposite corners of the protective cover.

9. The protective cover as described in claim 6, wherein the at least one connecting structure comprises two connecting structures respectively extending from one edge to another edge which is opposite to the one edge of the protective cover.

10. The protective cover as described in claim 6, wherein the at least one connecting structure comprises four connecting structures respectively arranged close to four corners of the protective cover, and each connecting structure extends along an oblique angle direction.

11. The protective cover as described in claim 6, wherein the at least one connecting structure comprises four connecting structures respectively extending along an oblique direction from two opposite edges of the protective cover to an edge connecting the two opposite edges of the protective cover, and a connecting structure extending from one of the two opposite edges to the other one of the two opposite edges.

* * * * *